Jan. 12, 1965  S. R. ROSENBERG  3,165,127
PEANUT BUTTER DISPENSER
Filed Nov. 16, 1961  3 Sheets-Sheet 1
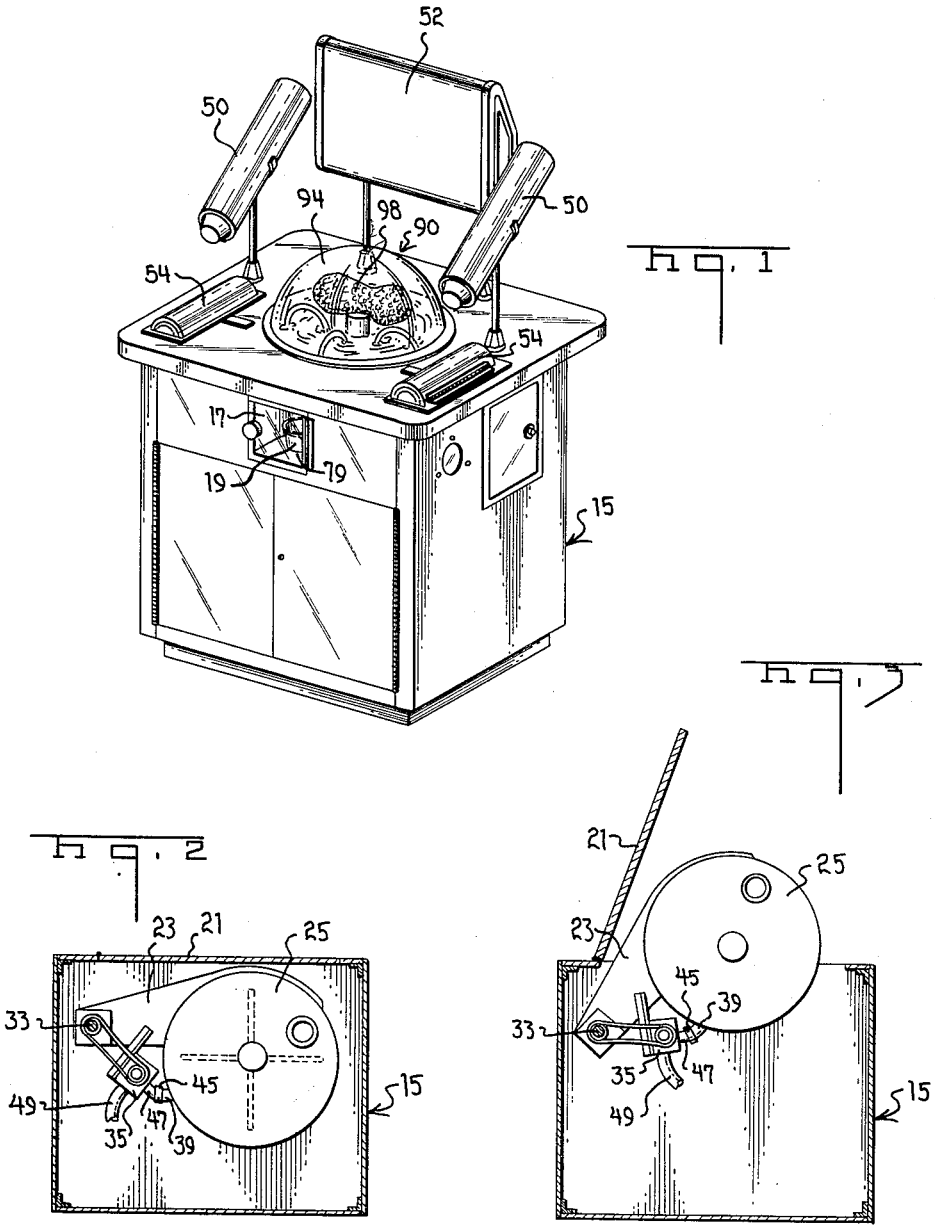
INVENTOR.
SAUL R. ROSENBERG
BY
Wynne + Finken

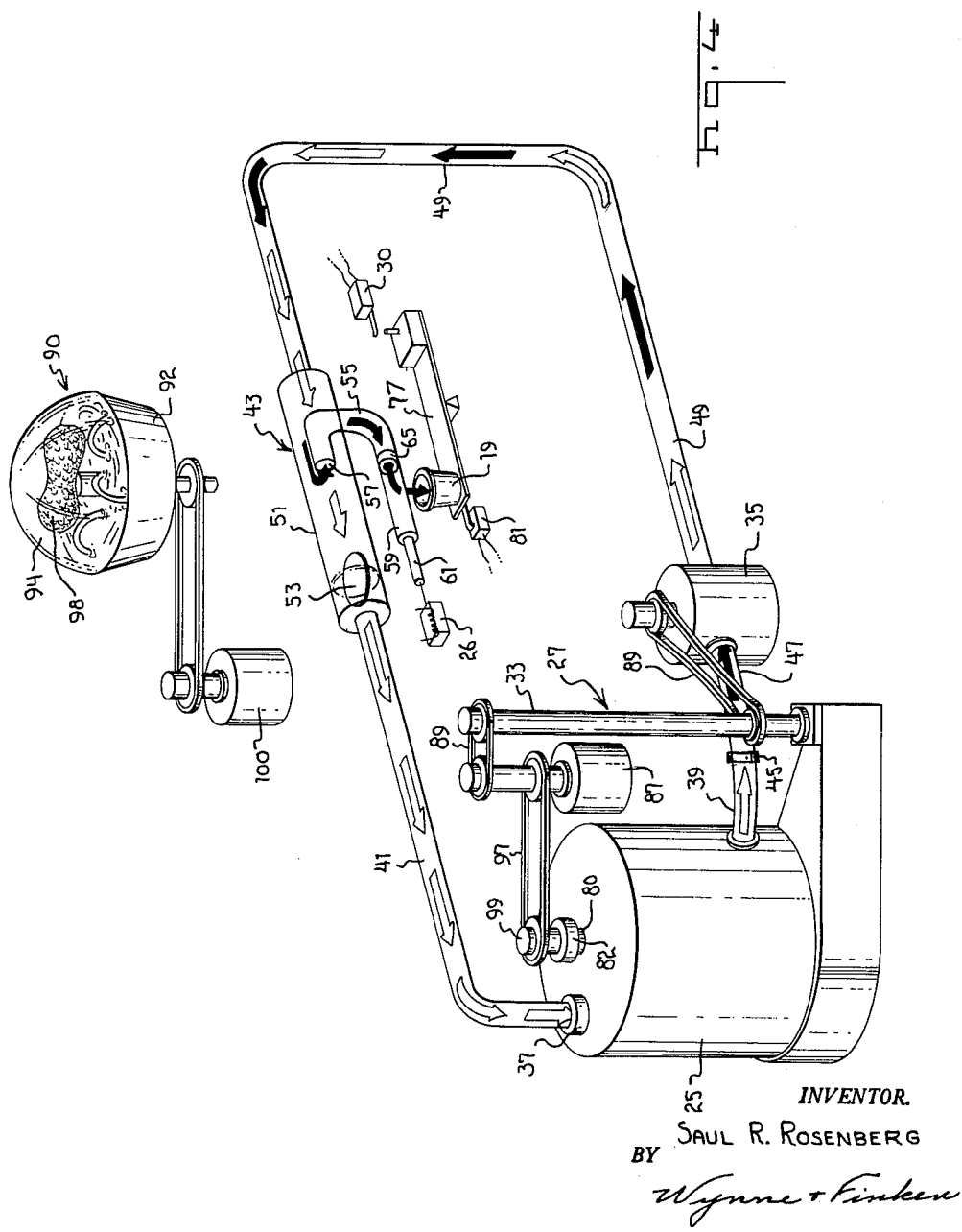

Jan. 12, 1965    S. R. ROSENBERG    3,165,127
PEANUT BUTTER DISPENSER
Filed Nov. 16, 1961    3 Sheets-Sheet 3
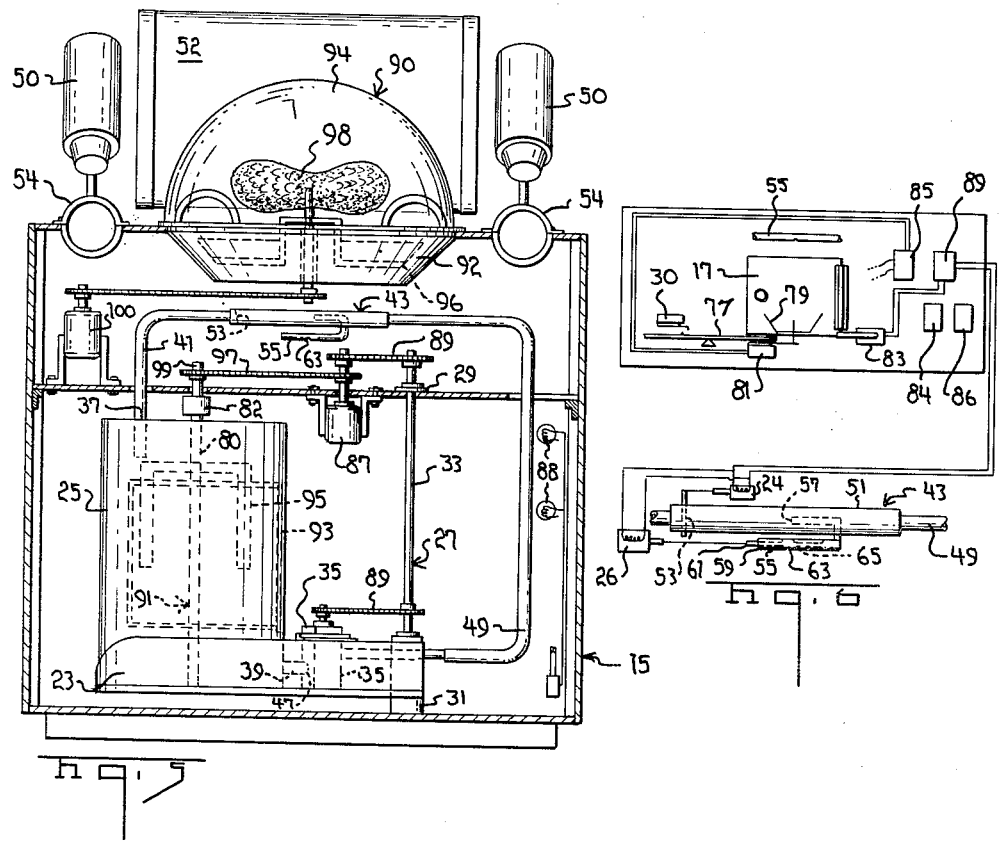
INVENTOR.
SAUL R. ROSENBERG
BY Wynne + Finken

United States Patent Office 3,165,127
Patented Jan. 12, 1965

3,165,127
PEANUT BUTTER DISPENSER
Saul R. Rosenberg, Los Angeles, Calif., assignor to Food Corporation of America, Los Angeles, Calif., a corporation of California
Filed Nov. 16, 1961, Ser. No. 152,798
2 Claims. (Cl. 141—83)

This invention relates to a peanut dispenser. More particularly, this invention relates to a device which may be placed in a food store and which enables the dispensing of measured quantities of freshly made peanut butter from a refillable or replaceable storage reservoir in the unit. The dispensing cabinet is designed to enable the placement of fresh peanut butter in the unit at proper intervals so that fresh peanut butter is always available.

A unique system is provided for circulation of the peanut butter in a heated condition to facilitate flow and produce a pleasant aroma. Upon actuation of a control device a cycle is initiated during which a predetermined measured amount of peanut butter is dispensed into a jar or container placed in the proper location by the customer. Upon the completion of the dispensing of a predetermined quantity, the cycle is stopped and the jar may be removed and capped. It will be understood that a coin operated mechanism can control the cycle.

The supply container is supported on a pivotally mounted support which may be swung out from within the housing to an accessible position for refilling or replacing the container. The invention provides for easy removal of the return conduit of the container as well as an easily released driving connection to the stirrer in the container. The pump is preferably mounted on the pivotal support, the drive for the pump being transmitted through the vertical shaft of the pivot means from a motor mounted on an upper frame member of the housing. Control means are provided for predetermined actuation of the delivery valve means whereby a foolproof supply system is provided. The combination of these units within the housing is such that an efficient supply system is provided for replenishing bulk in the storage container is facilitated. A display of bulk peanut butter is provided at the top of the housing with a display stirrer driven by its own motor.

My invention is directed to a device adapted to dispense peanut butter from a closed container as well as to a peanut butter dispensing device in which the container is a structural unit.

Other important objects and advantageous features of the invention will be apparent from the following description and accompanying drawings, wherein, for the purpose of illustration herein, a specific embodiment of this invention is set forth in detail, and wherein:

FIG. 1 is a perspective view of the device;
FIG. 2 is a top cross-sectional view of the pivotal units of the device;
FIG. 3 is a view similar to FIG. 2 with the pivotal units swung out of the housing;
FIG. 4 is a diagrammatic view showing the flow pattern and the display unit;
FIG. 5 is a side cross-sectional view showing the location of units;
FIG. 6 is a schematic circuit diagram of the control means; and
FIG. 7 is a cross-sectional view of a suitable delivery valve means.

Referring now to FIGS. 1-5, it will be seen that my invention includes a housing 15 having a front control door 17 into which an empty cup 19 is placed and a large rear door 21 which enables the outward pivoting of a lower container support 23 on which the storage container 25 sits. Pivot means 27 provide the pivotal mounting for the support 23, the pivot means including upper and lower bearings 29, 31 in the housing 15 and the rotatable vertical shaft 33 mounted therein. In the preferred embodiment, pump 35 is mounted on the support 23 for swinging movement therewith.

It will be noted that the container 25 has an upper inlet 37 and a lower outlet 39, the upper inlet 37 being releasably connected by a return conduit 41 to a delivery valve means 43 and the outlet 39 being releasably connected to the intake 47 of the pump 35 through a releasable coupling 45, this coupling requiring disconnection only upon removal of the container 25. The discharge of the pump 35 is connected by a flexible delivery conduit 49 to the inlet of the delivery valve means 43, a flexible conduit being used here to enable the pivoting action of the pump 35 along with the support 23.

The delivery valve means 43 is mounted at the front of the housing above the front control door 17 and in the embodiment shown in FIGS. 4–6 includes a pipe 51 having a butterfly valve 53 pivotally mounted therein adjacent the discharge end and a tube 55 mounted therein with its inlet opening 57 facing downstream toward the butterfly valve 53, its outlet end portion 59 extending outwardly of the pipe 51 and having a piston 61 mounted therein closing the tube, the tube having a downwardly facing discharge orifice 63 in its wall as well as an annular seat 65 upstream of the orifice 63 for sealing engagement with the piston 61 to close the orifice. Suitable control means, such as solenoids, actuate the butterfly valve and piston, as will be explained.

FIG. 7 shows another form of the delivery valve means 43 wherein outer and inner telescoping pipe sections 67 and 69 are connected to the return and delivery conduits 41 and 49, one of the sections 67 having a discharge orifice 71 and the sections 67, 69 being movable relative to each other to open and close the discharge orifice 71. Bar 73 attached to one of the sections 69 is engageable by an actuated means such as solenoid 75 to control this actuation, the flexible conduits 41 and 49 enabling movement. It will be noted that an insert 78 is provided in section 67 for engagement with the end of the inner telescoping pipe section 69 upon closing of the orifice 71.

The delivery valve means 43 of FIG. 4 does not cause a pressure of peanut butter upon the seal of piston 61 when the butterfly valve 53 is open in that the tube opening 57 faces downstream and only upon partial or complete closing of the butterfly valve 53 does sufficient pressure build up to cause reverse flow through the tube 55. Effective control of flow is possible with this arrangement. In the embodiment shown in FIG. 7 suitable discharge is accomplished without a baffle means, however, in some situations, a butterfly valve may prove desirable downstream from the orifice 71 to increase the flow rate. It will be noted that this modification results in no dead spaces— all peanut butter in the supply system is circulated.

A predetermined amount of peanut butter is dispensed into a cup by utilization of the scale 77 (FIG. 4), the cup 19 being passed through the door 17 and placed on the holder 79 of the scale 77, this placement closing switch 81 which after closure of door 17 and its switch 83 activates relay 85 and turns on motor 87 which through transmission means 89 drives pump 35 to produce a flow of peanut butter from the container 25 through the delivery and return conduits 49 and 41. When the control door 17 is closed, butterfly valves 53 is pivoted to a partially closed or closed position by its solenoid 24 and the orifice 63 is opened by movement of piston 61 by its solenoid 26, solenoids 24 and 26 being controlled by the relay 89 which is actuated when door 17 is closed.

When a predetermined weight of peanut butter has been discharged through orifice 63 into cup 19, the scale 77 is moved to a predetermined position where it engages and actuates switch 30 which in turn actuates relays 89 and 85 to return the butterfly valve 53 to its open position through solenoid 24 and to return the piston 61 to its sealed position over orifice 63 through its solenoid 26. The power means 87 is stopped. The door 17 may then be opened and the filled cup removed.

Container 25 is provided with a stirrer 91 (FIG. 5) which has a scraper 93 which engages the side walls and bottom of the container as well as depending stirring blades 95. Power for this stirrer 91 is received directly through a chain connection 97 to the motor, the stub drive shaft 99 mounted in the housing 15 over the upper end of the stirrer shaft 80 being connected thereto by a releasable coupling 82, this releasable coupling being utilized to enable the disconnection of this drive when the container 25 and its support 23 are swung outwardly of the housing. Before such outward pivoting the flexible return conduit 41 is pulled out of the inlet 37.

Since it is possible that average demand for cup filling may result in inactivity of the pumping operation for several hours and since it has been found desirable to pump and/or stir pure peanut butter periodically to prevent the separation of oil from solids, another condition of demand for pump operation has been designed into the machine.

The demand signal in this case comes from the one-hour timer 84 which may be pre-set to initiate pump action up to thirty minutes of each hour, a twenty-four-hour timer 86 enables pump action when the store is closed.

Because motor 87 which drives pump 35 also drives stirrer 91, each of these conditions of demand for pump operation results in a desirable stirring action of the peanut butter thereby preventing separation of oil and soilds.

At such times as pump action is initiated by demand signal from timer 84 or 86, all butter pumped returns to the reservoir.

When pumping is initiated by placing a cup in cup holder 79, approximately 50% of the butter pumped is drawn out through fill tube 55. The balance returns to the reservoir.

A thermostatically controlled heated element 88 is mounted in the housing to maintain the temperature of the peanut butter at about 100° F., the preferred temperature range being between 100° F. and 160° F.

The housing includes a display turret 90 including a display bowl 92 and a plastic bubble 94, a display stirrer 96 extending upwardly through the bottom of the bowl and having a display peanut 98 of large size mounted thereon, the lower end of this peanut holding shaft and stirrer 96 being driven by its own motor 100 mounted on the housing. Also on the top of the housing are cup holders 50, a sign display standard 52 and cup top dispensers 54 sunken in the top surface.

Merchandising programs with this dispenser have involved the utilization of a counter whereby the number of cups filled is recorded, the customer making payment at the check-out station. Coin operated machines may also be employed.

While the present preferred embodiment of the invention has been illustrated and described, it will be recognized that the invention may be otherwise variously embodied and practiced within the scope of the following claims.

I claim:
1. A device for dispensing peanut butter comprising
a closed container having an upper inlet and a lower outlet and a rotatable stirrer therein with the upper end of its shaft terminating above the top of the container,
a housing including a lower container support, pivot means including a rotatable vertical shaft mounting said support on the housing for movement between a position within the housing to a position outside of said housing, an upper frame member and a front control door,
a supply system having a return conduit releasably connected to the container inlet and a delivery conduit releasably connected to the container outlet, a delivery valve means connecting the delivery and return conduits, a pump mounted on said support and connected in said delivery conduit,
a cup scale mounted on said housing having a holder at said control door for placing a cup in position to be filled by peanut butter discharging from said delivery valve means,
power means mounted on said upper frame member for driving said pump and having a releasable connection for rotating said upper end of the shaft of said stirrer in the container, transmission means connecting said power means to the upper end of said vertical shaft and the lower end of said vertical shaft to said pump,
control means for automatic operation including first means responsive to a cup on said holder and said control door in closed position to actuate said pump and open said delivery valve means, second means responsive to a predetermined position of said scale when said cup is filled to close said delivery valve means and stop said pump.

2. A device for dispensing peanut butter from a closed container which has an upper inlet and a lower outlet comprising
a housing including a lower container support, pivot means mounting said support on the housing for movement between a position within the housing to a position outside of said housing, and a front control door;
a supply system having a return conduit connectible to the container inlet and a delivery conduit connectible to the container outlet, a delivery valve means connecting the delivery and return conduits, a pump mounted on said support and connected in said delivery conduit;
a cup scale mounted on said housing having a holder at said control door for receiving a cup in position to be filled by peanut butter discharging from said delivery valve means;
control means for automatic operation including first means responsive to a cup on said holder and said control door in closed position to actuate said pump and open said delivery valve means, second means responsive to predetermined position of said scale when said cup is filled to close said delivery valve means and stop said pump, said delivery valve means includes a pipe having a delivery end connected to said delivery conduit and a discharge end connected to said return conduit, a butterfly valve pivotally mounted in said pipe adjacent said discharge end, a tube having an inlet end portion extending into said pipe and an inlet opening facing downstream toward said butterfly valve, said tube having an outlet end portion extending out of said pipe, and a piston mounted in and closing the outlet end portion of said tube, said tube having a discharge orifice in the wall at the outlet end portion and an annular seat for said piston upstream of said orifice whereby actuation of said piston by said control means opens and closes said orifice.

References Cited in the file of this patent
UNITED STATES PATENTS

| 1,912,304 | Phillips | May 30, 1933 |
| 2,331,435 | Stambaugh | Oct. 12, 1943 |
| 2,682,161 | Ihle et al. | June 29, 1954 |
| 3,023,790 | Zaruba | Mar. 6, 1962 |